US012277612B1

(12) United States Patent
Collins

(10) Patent No.: US 12,277,612 B1
(45) Date of Patent: Apr. 15, 2025

(54) CROP MANAGEMENT SYSTEM THAT PLANS AND TRACKS NUTRIENT DELIVERY OVER TIME

(71) Applicant: Honcut Holdings LLC, Santa Cruz, CA (US)

(72) Inventor: Jameson Collins, Bangor, CA (US)

(73) Assignee: Honcut Holdings LLC, Santa Cruz, CA (US)

( * ) Notice: Subject to any disclaimer, the term of this patent is extended or adjusted under 35 U.S.C. 154(b) by 0 days.

(21) Appl. No.: 18/793,216

(22) Filed: Aug. 2, 2024

(51) Int. Cl.
*G06Q 50/02* (2024.01)
*A01C 21/00* (2006.01)

(52) U.S. Cl.
CPC ........... *G06Q 50/02* (2013.01); *A01C 21/005* (2013.01); *A01C 21/007* (2013.01)

(58) Field of Classification Search
CPC ...... G06Q 50/02; A01C 21/005; A01C 21/007
See application file for complete search history.

(56) References Cited

U.S. PATENT DOCUMENTS

| | | | | |
|---|---|---|---|---|
| 8,671,006 | B2* | 3/2014 | Zyskowski | G06Q 10/0637 800/260 |
| 10,645,868 | B2* | 5/2020 | Miller | A01C 23/007 |
| 2013/0060473 | A1* | 3/2013 | Tomida | A01G 25/167 702/3 |
| 2013/0073331 | A1* | 3/2013 | Nudd | G06Q 10/10 705/7.21 |
| 2017/0325456 | A1* | 11/2017 | Lovatt | A01N 57/16 |
| 2021/0112705 | A1* | 4/2021 | Coolidge | G06Q 10/103 |
| 2022/0319165 | A1* | 10/2022 | Tran | A01G 25/165 |
| 2024/0298569 | A1* | 9/2024 | Hoffmann | G06Q 50/02 |

OTHER PUBLICATIONS

IP.COM—Prior art database, 2014.*
Kat the Farmer, "Calculating Fertilizer Blends"; retrieved on Aug. 1, 2024, from https://katthefarmer.com/farmer-blog/caculating-fertilizer-blends.
"Logan, et al., Crop Nutrition Apps" published by The Ohio State University Extension; dated May 25, 2018; retrieved from https://ohioline.osu.edu/factsheet/fabe-55202.

(Continued)

*Primary Examiner* — Mohamed Charioui
*Assistant Examiner* — Lynda Dinh
(74) *Attorney, Agent, or Firm* — ARC IP Law, PC; Joseph J. Mayo

(57) ABSTRACT

Crop management system that calculates and displays the amount of each nutrient applied to a crop over time. Fertilizer descriptions in the system's database include the amount of each nutrient in each fertilizer. Users may enter and edit a feeding schedule that describes how much of each fertilizer to apply to a crop at a sequence of feeding times. The system may combine the fertilizer descriptions and the feeding schedule data to calculate the amount of each nutrient applied at each time. Charts may be generated to display trends in nutrient fractions over time. Feeding schedules may be organized into growth stages. Users may select from a set of feeding schedule templates to create a new feeding schedule. The system may also include task management functions, and it may automatically generate and track feeding tasks based on the feeding schedules.

20 Claims, 13 Drawing Sheets

(56) References Cited

OTHER PUBLICATIONS

Farms.com, "Fertilizer Blend Calculator" retrieved on Aug. 1, 2024, from https://m.farms.com/agriculture-apps/technology/fertilizer-blend-calculator.

"Fertilizer Blend NPK Calculator" retrieved on Aug. 1, 2024, from https://albopepper.com/npk-fertilizer-calculator.php.

University of Georgia Extension, "Agricultural & Environmental Services Laboratories" retrieved on Aug. 1, 2024, from https://aesl.ces.uga.edu/soil/fertcalc/.

"Clemson Fertilizer Blend Calculator" retrieved on Aug. 1, 2024, from https://precisionag.sites.clemson.edu/Calculators/Fertility/fertBlend/.

Google Play, "Blend Calculator: Travis Redpath" retrieved on Aug. 1, 2024, from https://play.google.com/store/apps/details?id=com.redpath.blendca Iculator&hl=en_us&gl=US.

\* cited by examiner

FIG. 3

Dyna-Gro
Dyna-Gro Liquid Bloom 3-12-6

| Nutrients | | | | | | | | |
|---|---|---|---|---|---|---|---|---|
| Nitrogen | Phosphorus | Potassium | Magnesium | Sulfur | Calcium | Boron | Copper | Iron |
| 3% | 5.24% | 4.98% | 0.5% | 0.09% | 2% | 0.02% | 0.05% | 0.1% |
| Molybdenum | Manganese | Nickel | Zinc | Chlorine | | | | |
| 0.0009% | 0.05% | 0.0001% | 0.05% | 0.1% | | | | |

FIG. 5

Review Feeding Schedule

The table and graphs below outline all of the product amounts and targets for each week. To make edits, simply select the week on the left most column. When satisfied, click "Create Schedule".

Finalize Details

| | 1 | 2 | 3 | 4 | 5 | 6 | 7 | 8 | 9 | 10 |
|---|---|---|---|---|---|---|---|---|---|---|
| | Week 1 | Week 1 | Week 2 | Week 1 | Week 2 | Week 1 | Week 1 | Week 3 | Week 1 | Week 2 |
| Part A 14-0-8 | 29 mL | 23 mL | 23 mL | 20 mL | 20 mL | 15 mL | 15 mL | 15 mL | 10 mL | 10 mL |
| Part B 2-13-17 | 29 mL | 23 mL | 23 mL | 20 mL | 20 mL | 15 mL | 15 mL | 15 mL | 16 mL | 16 mL |
| Bloom 0-35-29 | - | 16 mL | 16 mL | 20 mL | 20 mL | 27 mL | 27 mL | 27 mL | 23 mL | 23 mL |
| Target PH | - | - | - | - | - | - | - | - | - | - |
| Target EC | 2.6 | 2.4 | 2.4 | 2.3 | 2.3 | 2 | 2 | 2 | 1.8 | 1.8 |
| Target PPM | - | - | - | - | - | - | - | - | - | - |

Crop Stages Calendar — 1201

| MON | TUE | WED | THU | FRI | SAT | SUN |
|---|---|---|---|---|---|---|
| Apr 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | May 1 | 2 | 3 | 4 | 5 |

Bars shown on the calendar:
- Apr 1–7: Cherries: Ripening (1203, black); Blueberries: Swell (1202, white)
- Apr 8–14: Blueberries: Ripening; Cherries: Harvest
- Apr 15–21: Blueberries: Ripening
- Apr 22–28: Blueberries: Harvest

FIG. 13

CROP MANAGEMENT SYSTEM THAT PLANS AND TRACKS NUTRIENT DELIVERY OVER TIME

BACKGROUND OF THE INVENTION

Field of the Invention

One or more embodiments of the invention are related to the field of agricultural management and control systems. More particularly, but not by way of limitation, one or more embodiments of the invention enable a crop management system that plans and tracks nutrient delivery over time.

Description of the Related Art

Existing farm management solutions track crop management activities such as fertilization. There is a wide variety of fertilizer products, and these are formulated with different concentrations of nutrients, such as nitrogen, phosphorus, potassium, and many other secondary and micro nutrients. Farms often mix different fertilizers together, and they vary these mixtures over time as a crop advances through different growth stages. With potentially complex fertilizer mixtures that change frequently, it can be difficult for farm personnel to easily plan and track the specific amounts of each nutrient that are applied at each time.

For at least the limitations described above there is a need for a crop management system that plans and tracks nutrient delivery over time.

BRIEF SUMMARY OF THE INVENTION

One or more embodiments of the invention may enable a crop management system that plans and tracks nutrient delivery over time. The system may guide users to generate a feeding schedule for one or more crops and may calculate the nutrients delivered at each point in time from the feeding schedule.

In one or more embodiments, the system may include a user interface, a database, and a processor coupled to the user interface and the database. The user interface may be used by personnel managing a crop of plants. The database may include multiple nutrients, and descriptions of multiple fertilizers that include the fraction of each nutrient in each fertilizer. The database may also include a feeding schedule, which has a sequence of times for fertilization of the crop, and an amount of each fertilizer applied to the crop at each of these times. The processor may be configured to calculate the fraction of each nutrient applied to the crop at each time of the feeding schedule. This nutrient fraction may be calculated for example as the weighted average of the fraction of each nutrient in each fertilizer, where the weight associated with each fertilizer is the amount of that fertilizer applied to the crop at each time. The processor may transmit the nutrient fraction of each nutrient at each time to the user interface.

In one or more embodiments, the nutrients may include nitrogen, phosphorus, and potassium. They may also include magnesium, sulfur, and calcium. They may also include boron, copper, iron, molybdenum, manganese, nickel, zinc, and chlorine.

In one or more embodiments, the processor may also generate a chart of the nutrient fraction of the nutrients across the sequence of times of a feeding schedule, and it may transmit this chart to the user interface. In one or more embodiments, the user interface may accept a selection of the nutrients to display in the chart. The selection may include selection of one or more nutrient groups from a set of nutrient groups that may include primary nutrients, secondary nutrients, and micro nutrients. Primary nutrients may include nitrogen, phosphorus, and potassium; secondary nutrients may include magnesium, sulfur, and calcium; micro nutrients may include boron, copper, iron, molybdenum, manganese, nickel, zinc, and chlorine.

In one or more embodiments, the fertilizers may include water. The fraction of each nutrient in water may be zero.

In one or more embodiments, the user interface may accept input from the personnel to create and edit the feeding schedule.

In one or more embodiments, the feeding schedule may also include a growth stage associated with each time of the sequence of times of the feeding schedule. In one or more embodiments, the growth stages may include three or more of: a germination stage, a clone stage, a vegetative stage, a stretch stage, a stack stage, a swell stage, a ripening stage, a seedling stage, a flower stage, a grow stage, a bloom stage, a fruiting stage, and a flush stage. In one or more embodiments, a feeding schedule may be created without identifying or naming specific growth stages.

In one or more embodiments, the database may include multiple feeding schedule templates, and the user interface may accept input from the personnel to define a new crop and to select a feeding schedule for the new crop from the feeding schedule templates.

In one or more embodiments, the database may also include one or more task entries. A task entry may include a task description, an assigned person selected from the personnel, and a task date. The user interface may accept input from the personnel to add or edit one or more new task entries, and it may display a calendar of assigned tasks to each user of the personnel. In one or more embodiments, the task entries may include feeding tasks obtained from the feeding schedule.

In one or more embodiments, the calendar may also display the growth stage for the crop associated with each calendar time period.

In one or more embodiments, the database may also include a journal associated with the crop of plants, and the user interface may accept a journal entry that includes one or more of a note and a picture, and it may transmit this journal entry to the journal.

BRIEF DESCRIPTION OF THE DRAWINGS

The above and other aspects, features and advantages of the invention will be more apparent from the following more particular description thereof, presented in conjunction with the following drawings wherein:

FIG. 3 shows a screenshot of the nutrient composition of a selected fertilizer from an illustrative embodiment of the invention.

FIG. 5 shows a screenshot of growth stages and stage durations for a selected feeding schedule from an illustrative embodiment of the invention.

FIG. 6 shows a screenshot of the fertilizers selected for the feeding schedule of FIG. 5, and the quantities of each fertilizer applied at each week of the schedule.

FIG. 12 shows a calendar view of the growth stages of crops.

FIG. 13 shows an illustrative journaling system that tracks crop status and accepts notes and pictures from users.

DETAILED DESCRIPTION OF THE INVENTION

A crop management system that plans and tracks nutrient delivery over time will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
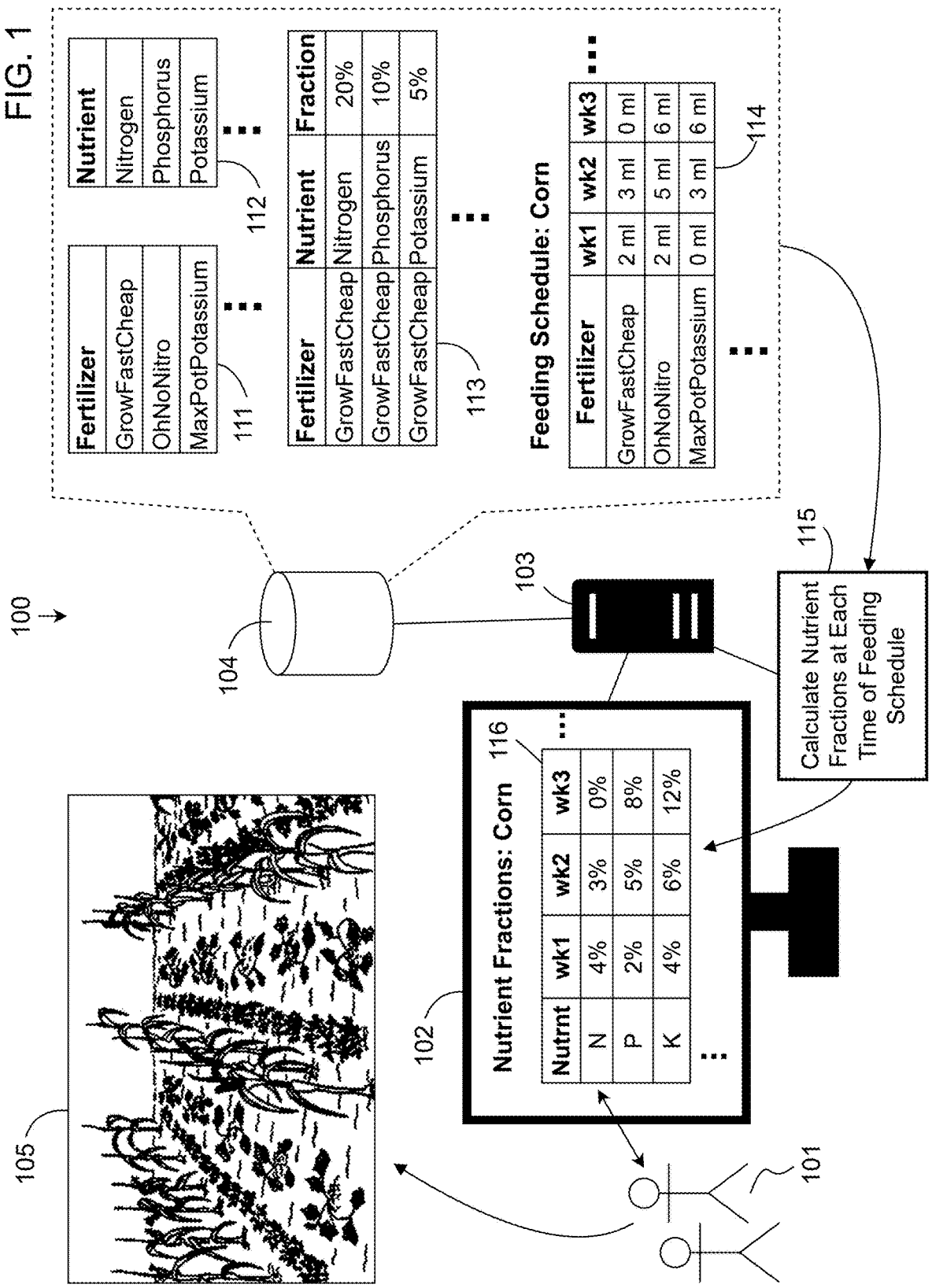
FIG. 1 shows an architectural diagram of an embodiment of the invention, which includes a user interface; a database of fertilizers, nutrients, and feeding schedules; and a processor that calculates nutrient levels and trends.

One or more embodiments of the invention may provide a system that may be used to plan, manage and monitor the delivery of nutrients to a crop of plants. FIG. 1 shows an architectural diagram of an illustrative embodiment 100 that is used by personnel 101 to manage one or more crops 105. Crop or crops 105 may include any type or types of plants, including for example, without limitation, vegetables, fruits, herbs, flowers, trees, shrubs, grains, hemp, or cannabis. Crops may be grown in any location or locations, including for example, without limitation, farms, gardens, indoor areas, plant beds, or greenhouses. Crops may have any number of plants and may cover any area.

System 100 includes user interface 102 that may be used by personnel 101. The user interface may utilize any type or types of output devices and user input devices, including both PC-based user interfaces with screens, keyboards, and pointing devices, and mobile devices such as tablets or phones. The system may have any number of user interface devices. The user interface subsystem may include hardware such as displays and input devices and software to manage input from the users and output to the user's displays.

System 100 also includes database 104 that may, for example, contain information about crop(s), fertilizers, and feeding schedules. Database 104 may include any type or types of storage systems, such as file systems, SQL or non-SQL databases, or object stores. Database 104 may be a distributed system with different types of information stored in different subsystems. FIG. 1 shows an illustrative set of tables that may be stored in database 104; the information in the database may be organized in any desired manner that may differ from the specific table structure shown in FIG. 1. Illustrative database 104 includes table 111 of fertilizers that may be available to fertilize crops 105. The fertilizers in table 111 may or may not be in stock in the farm or other entity managed by system 100; in one or more embodiments, other fertilizer information such as stock levels and prices may also be included in database 104. Database 104 also includes table 112 of nutrients that may be important for crop 105 or other crops. As described below, the nutrients tracked by system 100 may include major nutrients such as nitrogen, phosphorus, and potassium, as well as any other elements or compounds that may affect the plants of the crop. Table 113 provides descriptions of each of the fertilizers 111; for example, it may list the fraction by weight or by volume of one or more of the nutrients 112 in each fertilizer. Industrial fertilizers typically provide this nutrient fraction information in their specifications.

In one or more embodiments, system 100 may calculate some or all of the nutrient fractions in table 113 for a fertilizer based on other specification data for the fertilizer (or on results of laboratory analyses). For example, many fertilizers report their potassium fraction as the percentage by weight of potassium oxide ($K_2O$), rather than as the percentage of pure potassium. The system may convert this potassium oxide fraction to a pure potassium fraction (using the atomic weights of the elements in the compound) in table 113.

Database 104 may also contain feeding schedules for one or more crops. A portion of an illustrative feeding schedule 114 is shown for a crop of corn. A feeding schedule may indicate a sequence of times at which fertilizers will be applied to the crop (such as once per week), and the amounts of one or more fertilizers to be applied at each time. Fertilizer amounts may be specified by weight, volume, or concentration; the illustrative amounts shown in table 114 are the number of milliliters of each fertilizer to be added per liter of water, for example.

System 100 also includes a processor 103 that is connected to user interface 102 and to database 104. Processor 103 may be any type or types of processors, including for example, without limitation, a desktop computer, a laptop computer, a server, a tablet, a smartphone, or a network of any number of these devices. Processor 103 may be collocated with database 104 and user interface 102, or remote from these subsystems and connected by network links.

Processor 103 may perform calculations 115 that use the information in database 104 to determine the fractions of each nutrient that are applied at each time of a feeding schedule. These fractions may be for example by weight or by volume. The fractions may be based on absolute amounts of fertilizers applied or on the relative concentrations or amounts of fertilizers in a mixture. Processor 103 may then generate one or more tables, charts, graphs, or other visual elements to display the nutrient fractions over time associated with a feeding schedule, and it may transmit this information to user interface 102. For example, table 116 shows a portion of a table of nutrient fractions over time that correspond to feeding schedule 114.

FIGS. 2 through 9 show screenshots from an illustrative embodiment of the invention that provide examples of data entry and display screens that may be used to generate and edit the information in database 104, and to display the result of nutrient fraction calculations 115. These screenshots are illustrative; embodiments may use any types of user interface elements to provide the crop management functions associated with the invention.

Figure 2:
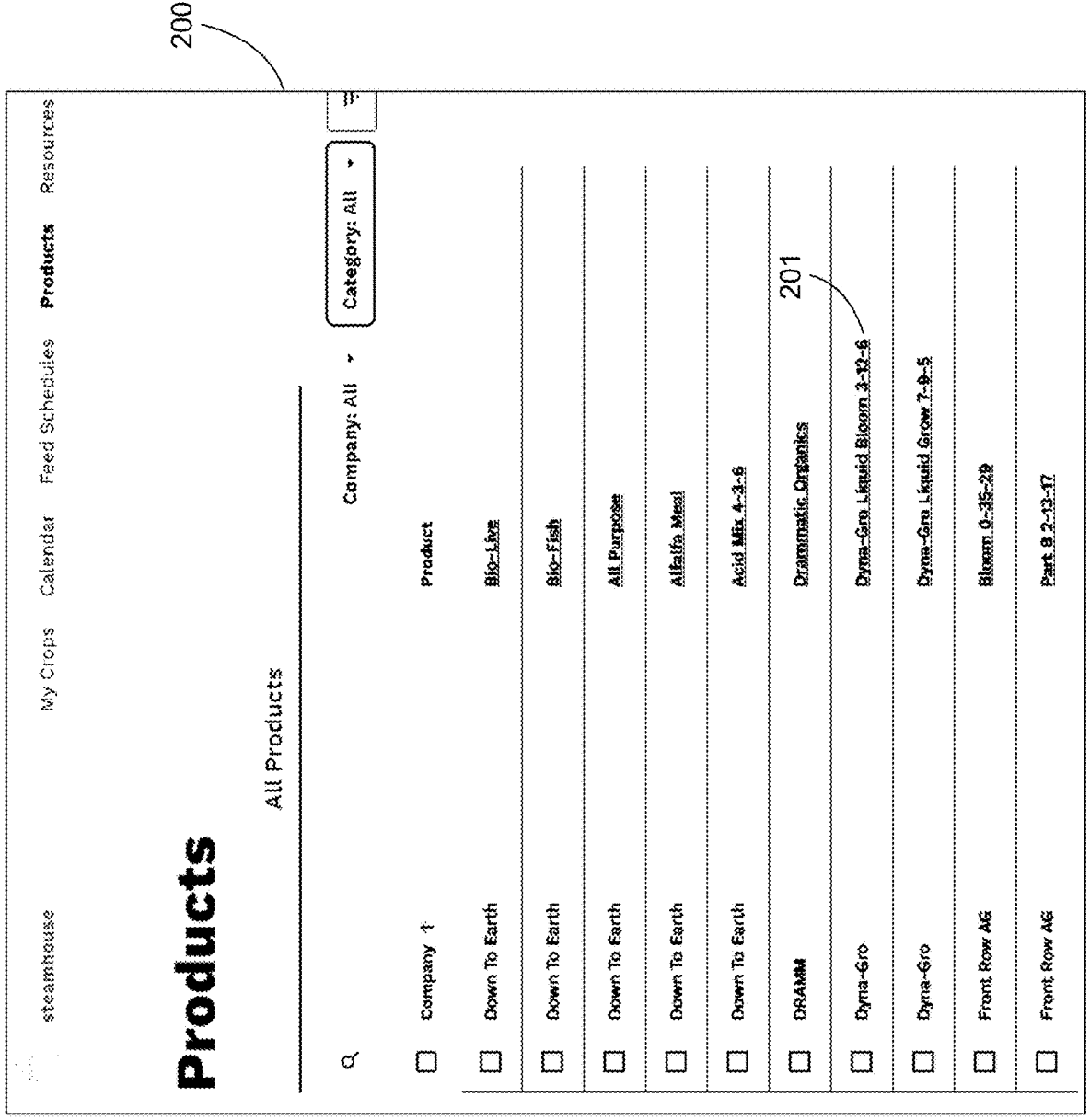
FIG. 2 shows a screenshot of a fertilizer list from an illustrative embodiment of the invention.

FIG. 2 shows an illustrative screen 200 that lists the fertilizers available to be applied to one or more crops. The list may be filtered, searched, and sorted. The user interface may also provide the ability to add, delete, or edit fertilizers. Information in screen 200 may correspond for example to table 111 in database 104.

FIG. 3 shows an illustrative screen 300 with a description of an illustrative fertilizer 201. This information may correspond for example to a selection from table 113 in database 104. Screen 300 may show the fraction of each nutrient (or of a subset of nutrients) in fertilizer 201. Any number of nutrients may be specified. If a nutrient is not specified in the description of a fertilizer, then in some calculations it may be presumed that the amount of that nutrient in the fertilizer is zero. A nutrient may be any element, compound, material, or mixture. In this example, 14 nutrients are listed for fertilizer 201. Conceptually these may be grouped into categories; for example, nutrients 301 (nitrogen, phosphorus, potassium) may be considered "primary" nutrients in this illustrative embodiment; nutrients 302 (magnesium, sulfur, calcium) may be considered "secondary" nutrients; and nutrients 303 (boron, copper, iron, molybdenum, manganese, nickel, zinc, chlorine) may be considered "micro" nutrients. These specific nutrients and their categorization are illustrative. Any list of nutrients may be identified in one or more embodiments. Any method of grouping or categorizing nutrients may be used in one or more embodiments. The fractions (percentages) of each nutrient may be by weight or by volume.

A "fertilizer" may be any product, mixture, solution, or material that may be applied to one or more crops. Fertilizers may include but are not limited to commercially available fertilizers. A fertilizer may contain any number of nutrients (including zero) in any amounts. In one or more embodiments, water may be identified as a fertilizer. In one or more embodiments, pesticides or products that include pesticides may also be identified as fertilizers.

Figure 4:
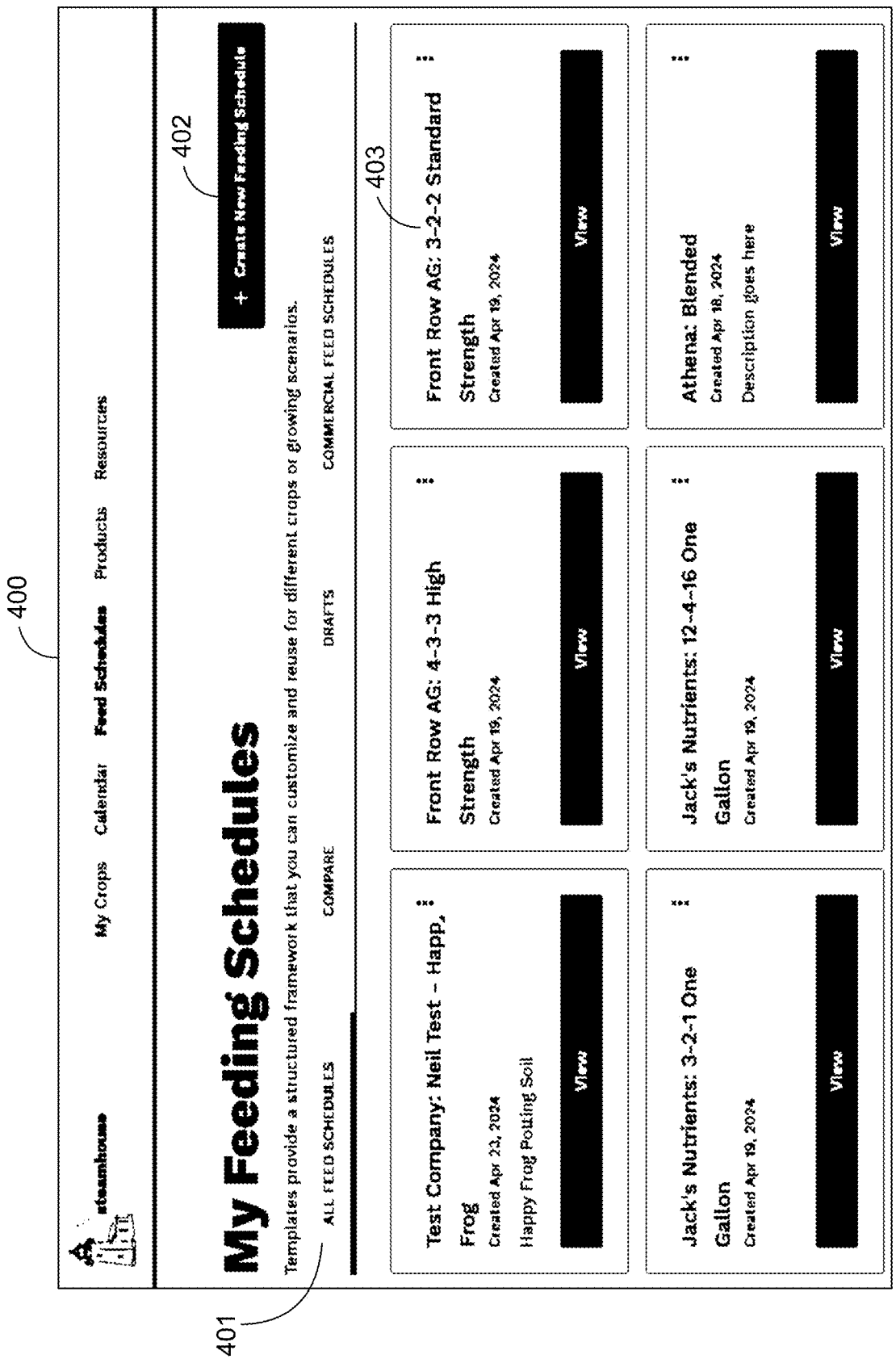
FIG. 4 shows a screenshot of a set of feeding schedules that may be used as templates from an illustrative embodiment of the invention.

FIG. 4 shows an illustrative screen 400 with a list 401 of feeding schedule templates that may be used to create a feeding schedule for a crop. To generate a particular feeding schedule, a user may select a template from the list and either use it as is or modify it for the particular crop. In one or more embodiments, feeding schedule templates may be shared across organizations. A user may use button 402 to create a new feeding schedule.

Figure 5:
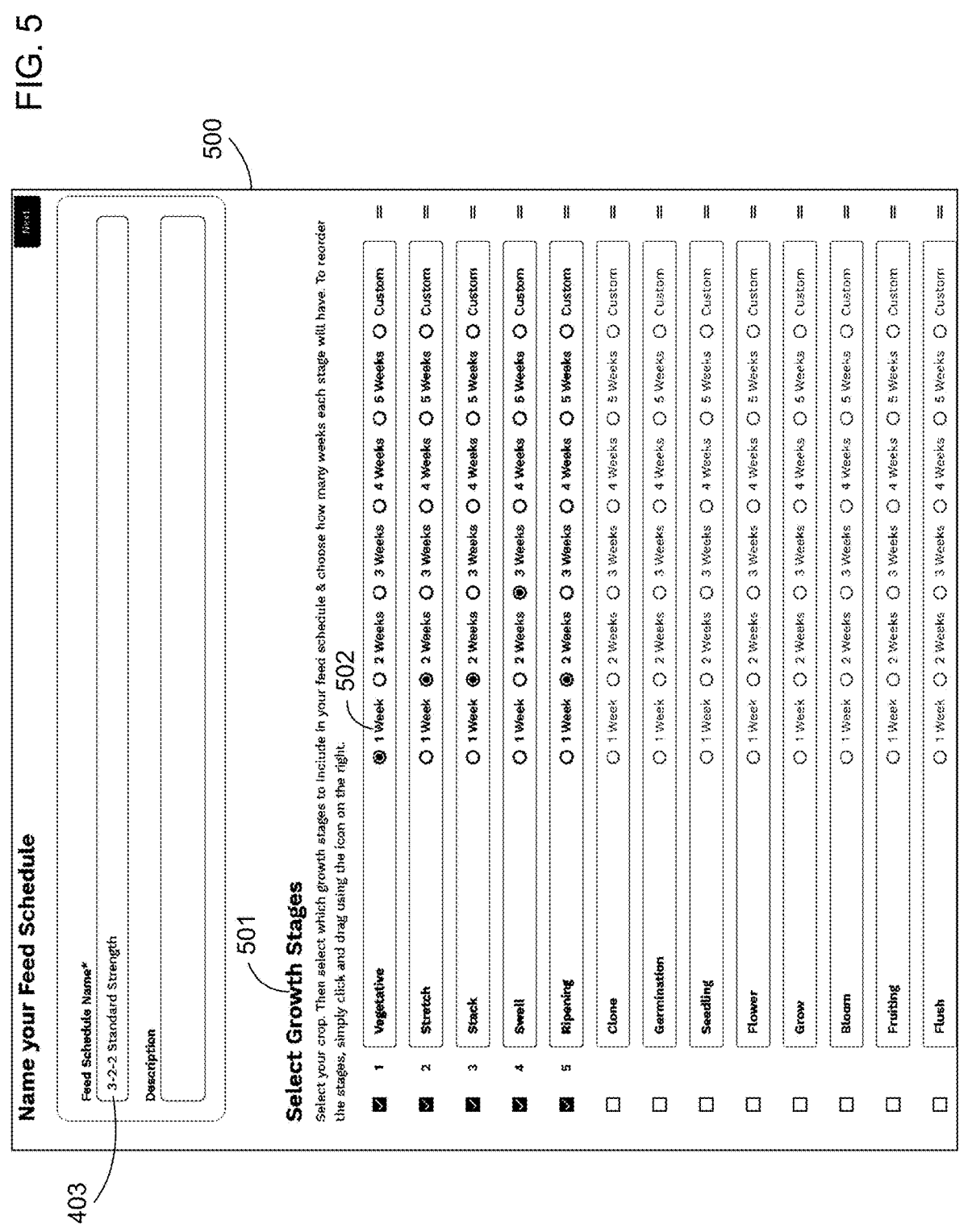

FIGS. 5 and 6 show illustrative steps to create feeding schedule 403. FIG. 5 shows illustrative screen 500 in which a user may define the sequence of times in a feeding schedule. In one or more embodiments of the invention, the feeding schedule times may be divided into growth stages. The user may select the growth stages appropriate for the selected crop from a list 501, and arrange these in the desired order. Illustrative growth stages may be for example, without limitation, a vegetative stage, a stretch stage, a stack stage, a swell stage, a ripening stage, a clone stage, a germination stage, a seedling stage, a flower stage, a grow stage, a bloom stage, a fruiting stage, and a flush stage. Growth stages may be given any desired names. Different stages may be applicable to different types of plants. Any number of growth stages may be defined for a feeding schedule; for example, some feeding schedules may have three or more growth stages. In one or more embodiments, it may be possible to define a feeding schedule without identifying or naming growth stages; for example, a feeding schedule may be simply a sequence of times (such as weeks) with the fertilizer amounts defined for each of these times.

If growth stages are defined, then the user may select a duration for each growth stage; for example, the user selects duration 502 of 1 week for the first stage. Although the feeding schedule 403 illustrated in FIG. 5 has durations in units of weeks, one or more embodiments may use any time units for durations and may arrange any sequence of periodic or non-periodic times for feedings.

FIG. 6 shows an illustrative screen 600 with which a user may define, edit, or review the specific fertilizers and fertilizer amounts applied at each time of the feeding schedule. This information corresponds for example to table 114 of database 104. In table 601 for feeding schedule 403, the user has selected three fertilizers 602 to use for the crop. Amounts of each of the fertilizers 602 are defined for each time of the feeding schedule (in this case for each week of each growth stage). Amounts may change as the feeding schedule progresses; for example, the amounts 603 in the last week (week 10) of the feeding schedule use less nitrogen and more potassium than at the beginning of the schedule, as illustrated below in FIG. 7.

The fertilizer amounts shown in table 601 are in units of milliliters; these amounts may be added for example per liter of water and then applied to the crop. Feeding schedules may use any units for amounts of fertilizers, and these may be absolute amounts or amounts per unit of another carrier or solvent such as water. The schedule 601 may implicitly include a fourth "fertilizer", which is water, in an amount of one liter at each feeding time. Water or similar carriers or solvents may be listed explicitly in a feeding schedule, or they may be implied in some embodiments.

Figure 7:
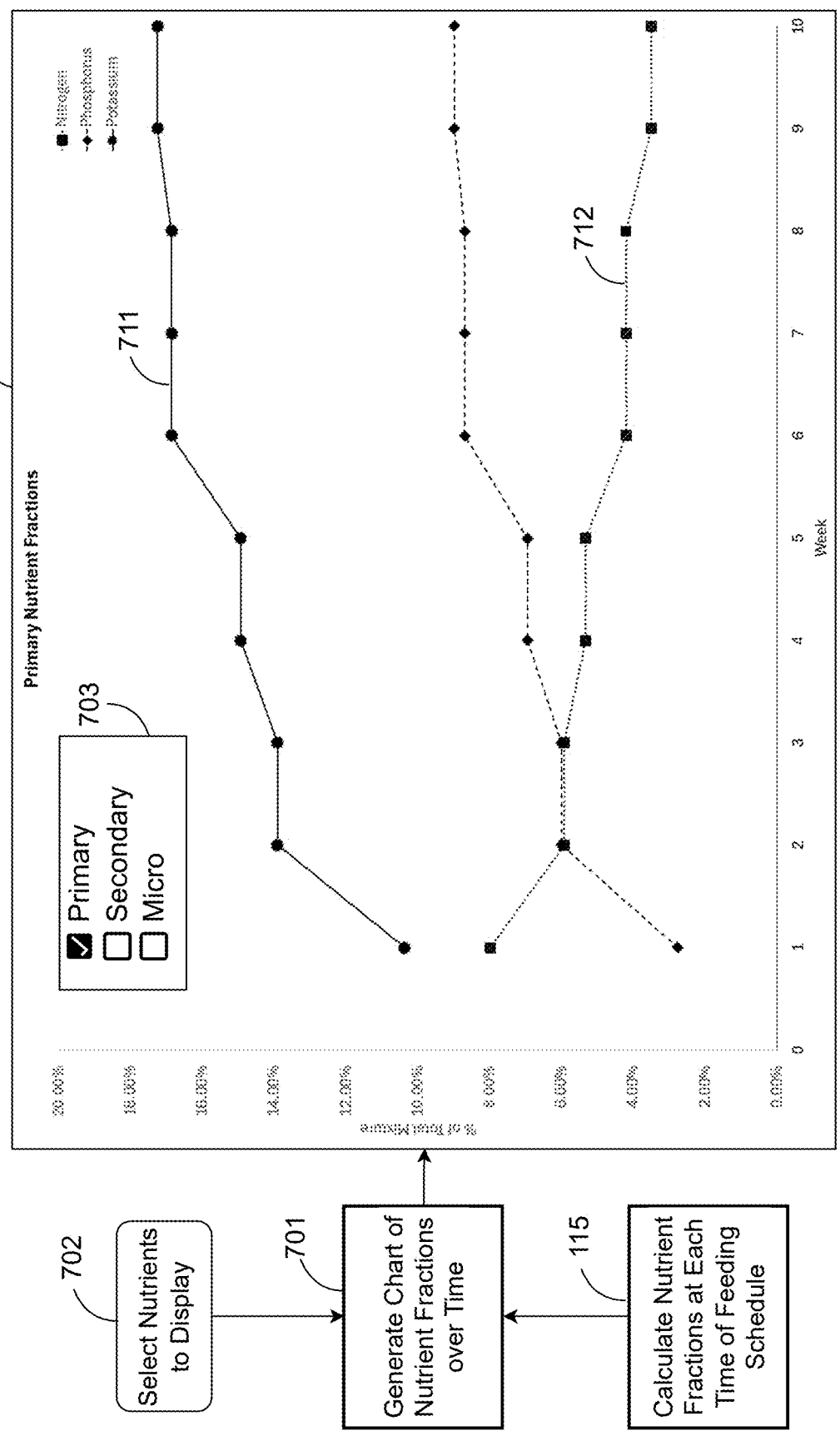
FIG. 7 shows a screenshot of a graph of the primary nutrient fractions over time for the feeding schedule of FIG. 6.
Figure 8:
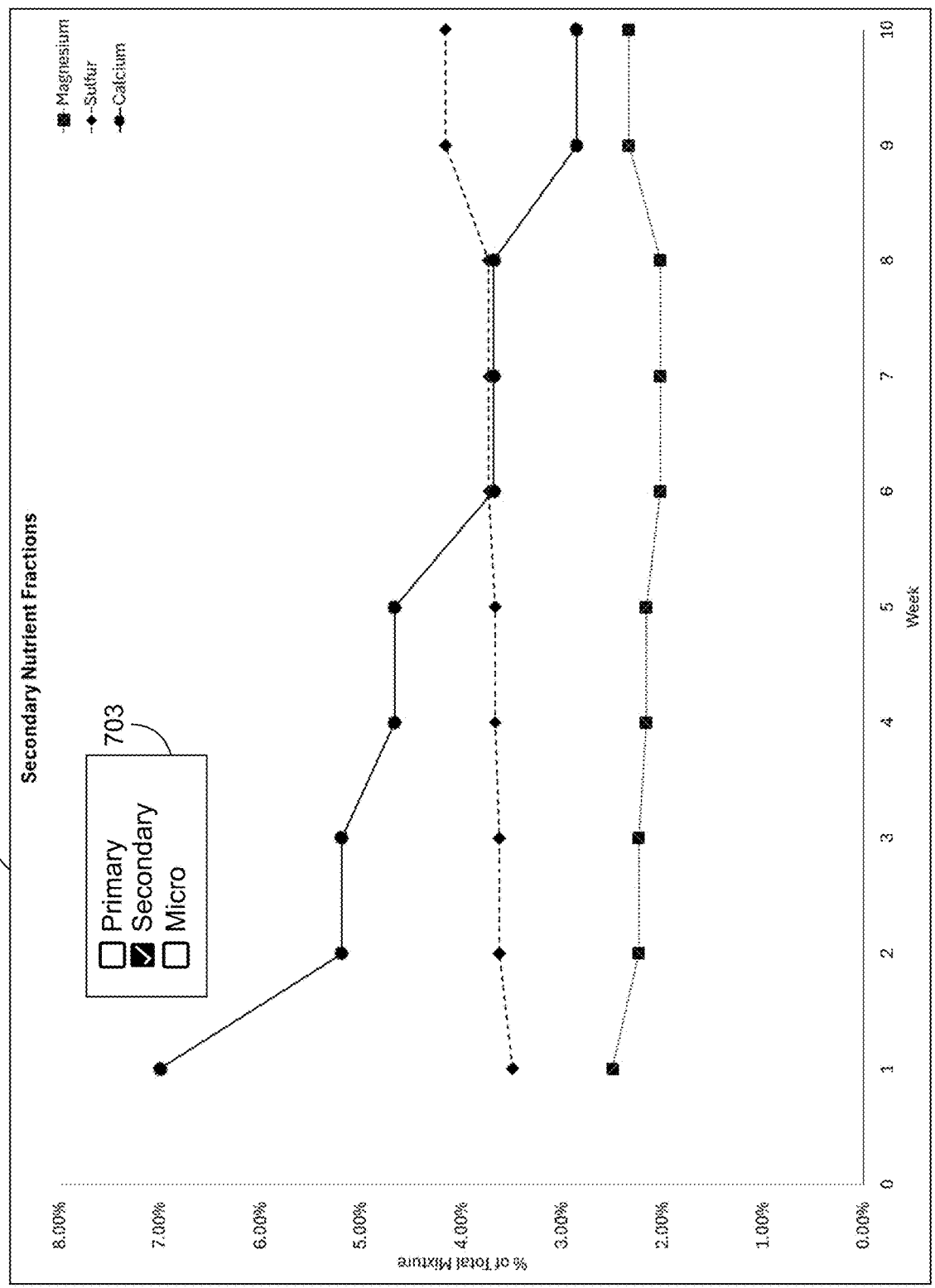
FIG. 8 shows a screenshot of a graph of the secondary nutrient fractions over time for the feeding schedule of FIG. 6.
Figure 9:
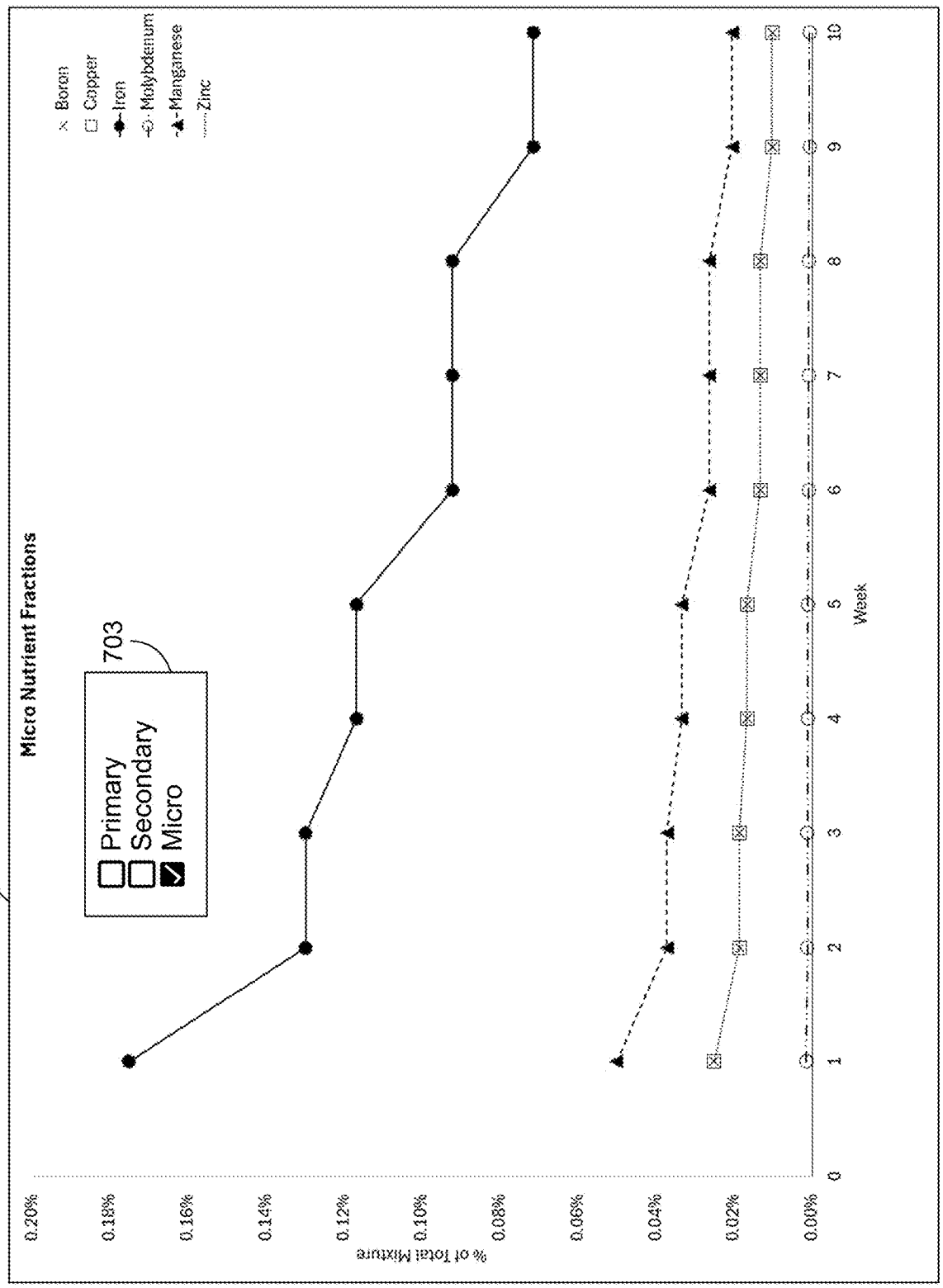
FIG. 9 shows a screenshot of a graph of the micro nutrient fractions over time for the feeding schedule of FIG. 6.

Based on the data in a feeding schedule, and on the nutrient information in fertilizer description data, one or more embodiments may calculate and display the fractions of nutrients applied to a crop at each point in the feeding schedule. FIG. 7 shows a result of this calculation for illustrative feeding schedule 403, with nutrient fractions shown as chart 700. In this example, after performing calculations 115 of the nutrient fractions at each time of the feeding schedule, the system may perform step 701 to generate a chart (or table or other type of display) of the nutrient fractions over time. In this illustrative embodiment, users may also perform a selection 702 of the nutrients to display in chart 700. For example, users may select one or more nutrient groups 703 to show in chart 700. Chart 700 shows only the primary nutrient group: nitrogen, phosphorus, and potassium. The nitrogen fraction 712 declines over time, and the potassium fraction 711 increases over time. FIG. 8 shows chart 800 with the nutrient fractions of feeding schedule 403 for the secondary nutrients: magnesium, sulfur, and calcium; and FIG. 9 shows chart 900 with the nutrient fractions of feeding schedule 403 for micro nutrients boron, copper, iron, molybdenum, manganese, and zinc. Illustrative charts 700, 800, and 900 are line charts; one or more embodiments may display nutrient fraction trend information with any type or types of charts, graphs, tables, or other methods of conveying the fraction information.

The nutrient fractions displayed in FIGS. 7 through 9 are expressed as percentages of the total amount of fertilizer mixed together, either by weight or by volume. In these illustrative charts, the amount of water or other carrier or solvent is not included in these calculations. In one or more embodiments, the amount of water (or equivalent) may also be included in the calculation of nutrient fractions, in which case the nutrient fractions would express each nutrient's percentage of the total applied solution (including water).

Figure 10:
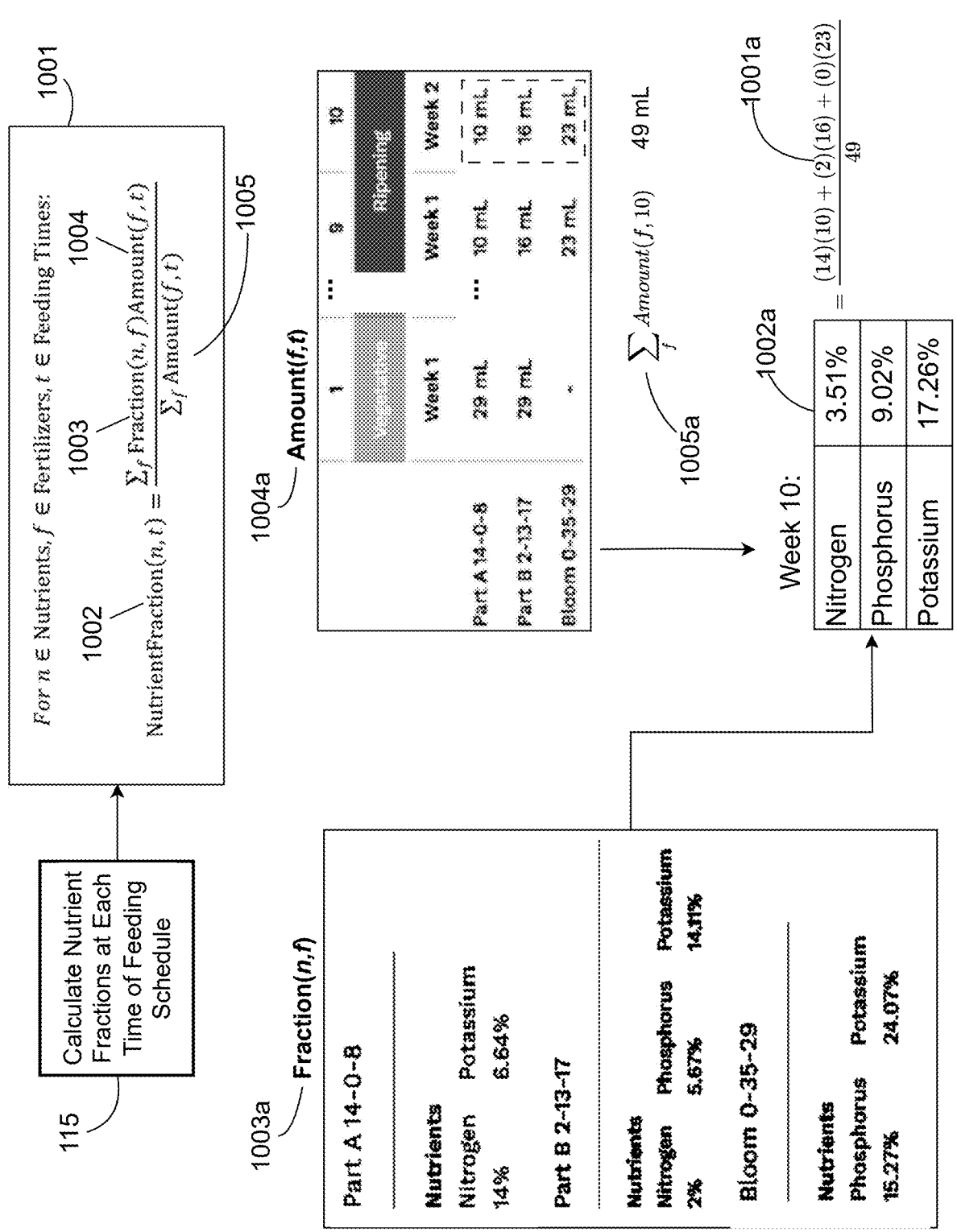
FIG. 10 illustrates calculation of the primary nutrient fractions shown in FIG. 7.

FIG. 10 shows an illustrative method 1001 for calculation 115 of the nutrient fractions at each time of a feeding schedule that may be used in one or more embodiments of the invention. The nutrient fraction 1002 for a nutrient at a specific time may be calculated as a weighted average of the fractions 1003 of that nutrient in each fertilizer, where the weights are the amounts 1004 of each fertilizer applied at that specific time. This weighted average may be calculated as the sum of the products of the nutrient fractions 1003 and the weights 1004, divided by the total 1005 of the weights (which is the total amount of all fertilizers applied at the specific time).

Calculation 1001 is illustrated for the final week (week 10) of feeding schedule 403, only for the primary nutrients for ease of illustration. Nutrient fractions 1003a of each primary nutrient in each of the fertilizers used in the feeding schedule are obtained for example from table 113 of database 104. The amounts 1004a of each fertilizer in the final week and their total 1005a are obtained from feeding schedule 403, as shown in FIG. 6 in table 601. The results 1002a of the calculation 1001 correspond to the values shown in chart 700 of FIG. 7 at week 10; calculation 1001a illustrates the specific calculation of the nitrogen fraction in week 10, for example.

If the amount of water (or equivalent carrier or solvent) is included in the nutrient fraction calculations, the same formula 1001 may be used with water (or equivalent) included as a "fertilizer". For example, if the amounts of each fertilizer at each week of the illustrative feeding schedule are added to one liter of water, then total amount 1005a would be 1049 mL (the 49 mL of the three fertilizers in table 1004a, plus 1000 mL of water), and calculation 1001a would change to [(14)(10)+(2)(16)+(0)(23)+(0)(1000)]/1049=0.16%. (The (0)(1000) term expresses that pure water does not contain any nitrogen; therefore the amount of water affects only the denominator of this calculation.)

Figure 11:
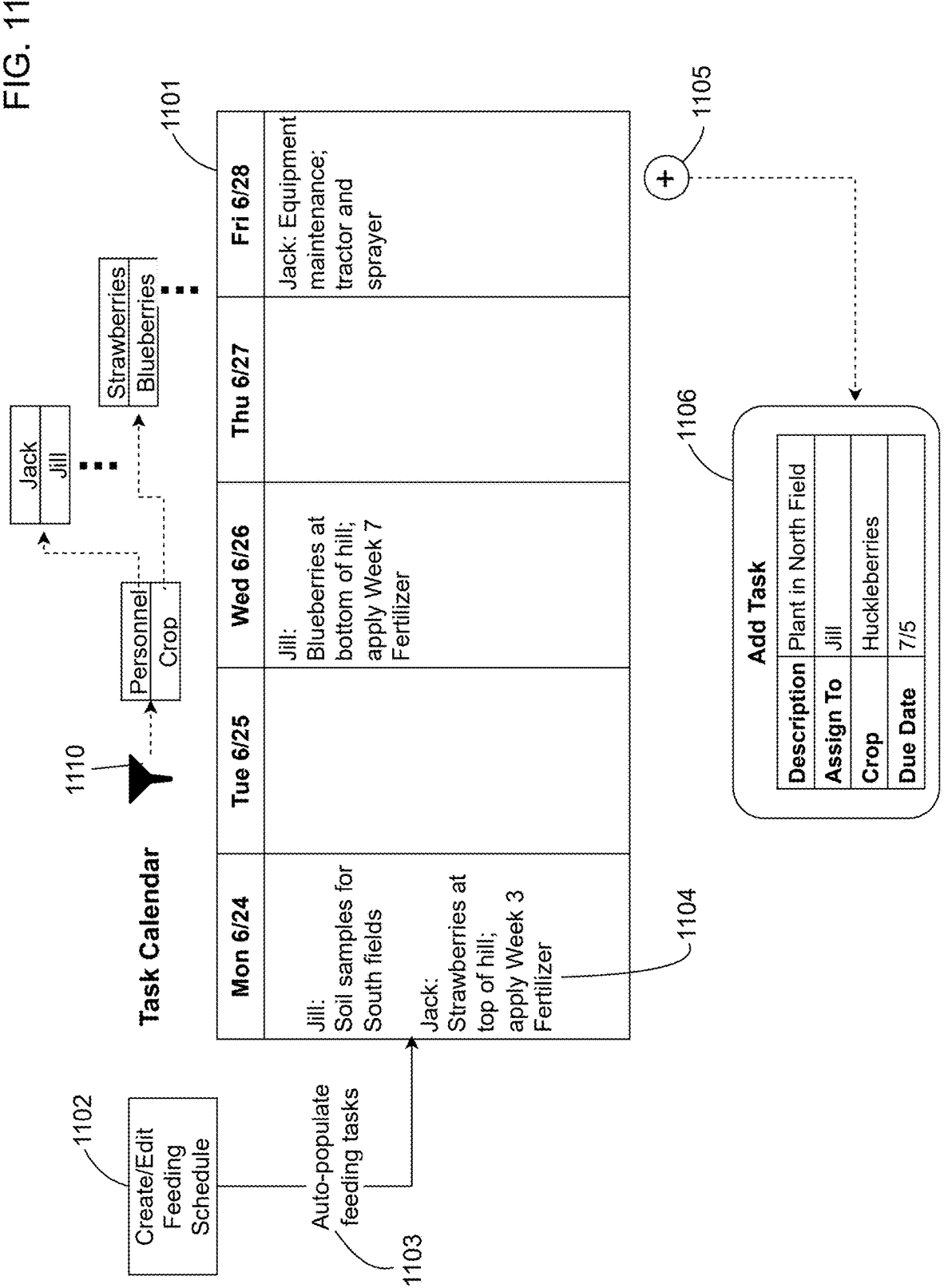
FIG. 11 shows a task management and calendaring system from an illustrative embodiment of the invention, which may be linked to feeding schedules.

In addition to planning and analyzing feeding schedules, one or more embodiments of the invention may also manage tasks, which may include but may not be limited to crop feeding tasks. FIG. 11 shows an illustrative portion of a task management capability that may be included in one or more embodiments of the invention. Personnel may be able to view calendar 1101 of assigned tasks; each person may view the tasks assigned to him or her, and some or all users may be able to see all of the tasks in the calendar. Illustrative calendar 1101 shows a weekly view; one or more embodiments may show views over any time period. In one or more embodiments, once a feeding schedule is created in step 1102, the system may perform an automatic population 1103 of the calendar with tasks that implement the feeding schedule. For example, task 1104 may be auto generated. Each task may have for example, without limitation, a due date, an assigned person or group, and a description. Some tasks may be associated with a specific crop or group of crops. Users may use button 1105 to add new tasks; illustrative new task 1106 has a description, an assigned person, an associated crop, and a due date. In one or more embodiments, users may be able to apply filter 1110 to the display of tasks; for example, they may be able to filter by personnel, by crop, or by other fields such as due dates.

One or more embodiments of the invention may also include one or more displays of the growth stages of each crop in a timeline or calendar view. FIG. 12 shows an illustrative calendar view 1201, shown here as a monthly view, that shows the growth stages of two different crops 1202 and 1203. Any number of crops may be displayed in such a view. In one or more embodiments a user may select the crop or crops to view. In one or more embodiments, a calendar view may integrate tasks such as those shown in FIG. 11 with crop growth stages as shown in FIG. 12 into a combined calendar view of both tasks and stages. If a feeding schedule for a crop is defined without identifying growth stages, a calendar view may indicate for example which week of the crop feeding schedule falls into each calendar time period. (For example, instead of indicating a named growth stage such as "Blueberries: Swell", the calendar view may indicate something like "Blueberries: Week 13".)

Figure 13:
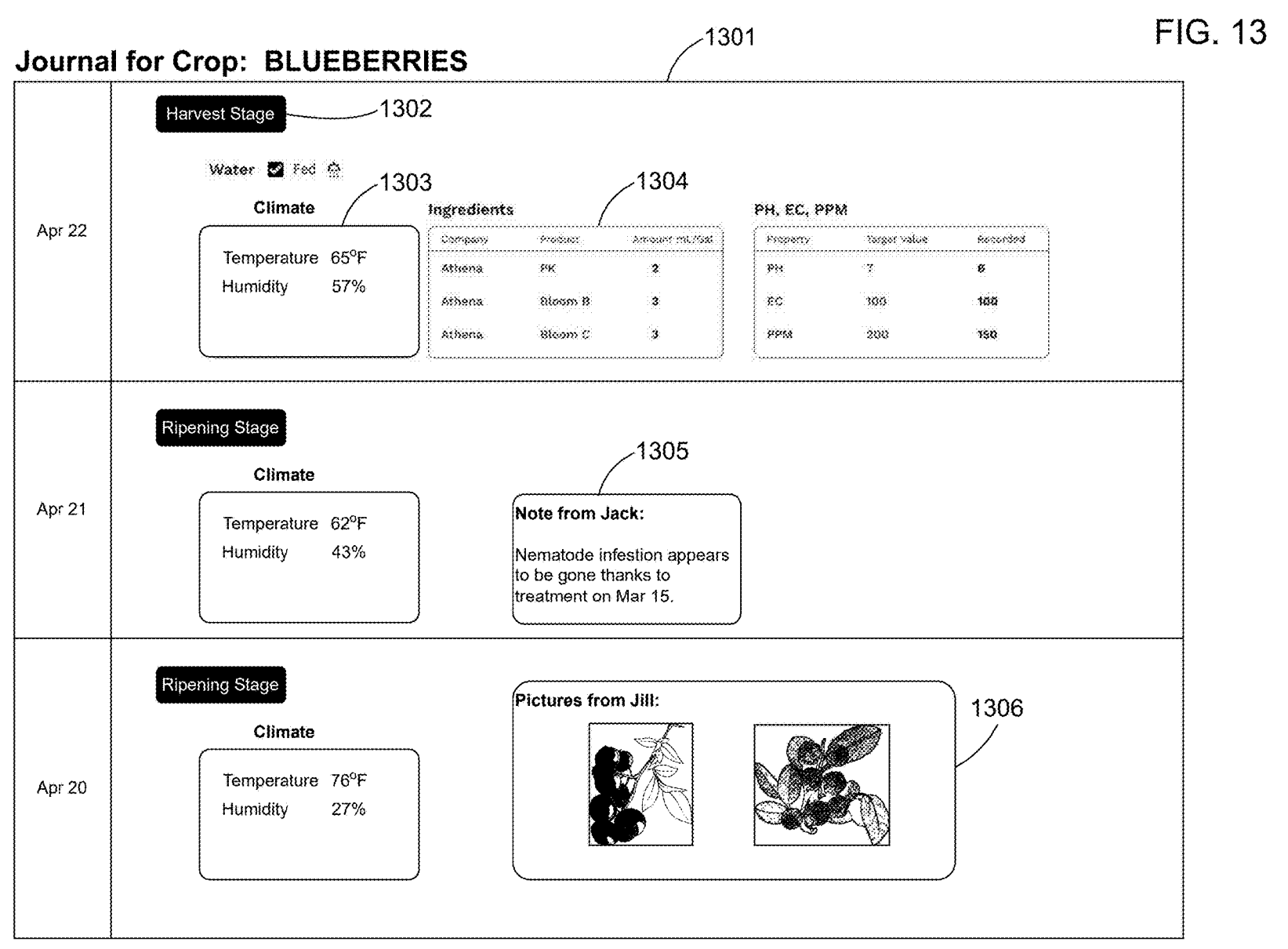

One or more embodiments of the invention may include capabilities for logging or journaling activities and other information related to crop management. FIG. 13 shows an illustrative set of journal entries 1301 over three days for a specific blueberry crop. Some journal information may be automatically entered. For example, the stage 1302 of the crop may be based on the growth stages and stage timing defined for the crop. Climate data 1303 may be entered manually or may be retrieved from weather reports or weather stations. Feeding information 1304 may be imported from the feeding schedule, or it may be entered by or confirmed by a user. A journal may also include data such as a note 1305 from a user, and pictures 1306 captured by a user or automatically by a drone or camera. The data shown in journal entries 1301 is illustrative; one or more embodiments may include any type of information that may be imported from the crop management system, imported from external data sources, or manually entered by users.

While the invention herein disclosed has been described by means of specific embodiments and applications thereof, numerous modifications and variations could be made thereto by those skilled in the art without departing from the scope of the invention set forth in the claims.

What is claimed is:

1. A crop management system that plans and tracks nutrient delivery over time, comprising:
   a user interface used by personnel managing a crop of plants;
   a database comprising information, wherein said information comprises
      a plurality of nutrients;
      descriptions of a plurality of fertilizers, wherein a description of a fertilizer of said descriptions comprises a fraction of each nutrient of the plurality of nutrients in the fertilizer; and
      a feeding schedule comprising
         a sequence of times for fertilization of the crop of plants, wherein said sequence of times comprises a time unit presented sequentially at which said fertilizer is applied to the crop of plants; and
         for each time of the sequence of times, an amount of each fertilizer of the plurality of fertilizers applied to the crop of plants defined at the each time of the sequence of times for fertilization of the crop of plants;
   a processor coupled to the user interface and to the database, wherein the processor is configured to
      for each time of the sequence of times from said feeding schedule and
      for each nutrient of the plurality of nutrients,
         calculate a nutrient fraction of the each nutrient at the each time as a weighted average of the fraction of the each nutrient in each fertilizer of the plurality of fertilizers across the plurality of fertilizers using said information in the database, wherein a weight associated with the each fertilizer comprises the amount of the each fertilizer applied to the crop of plants at the each time,
wherein the weighted average is calculated as a sum of products of all nutrient fractions from the nutrient fraction calculated of the each nutrient of the plurality of nutrients and the weight of said each fertilizer, divided by a total amount of all fertilizers applied at the each time of the sequence of times of said feeding schedule; and
transmit the nutrient fraction of said each nutrient at said each time to the user interface.

2. The crop management system that plans and tracks nutrient delivery over time of claim 1, wherein the plurality of nutrients comprises:
nitrogen;
phosphorus; and,
potassium.

3. The crop management system that plans and tracks nutrient delivery over time of claim 2, wherein the plurality of nutrients further comprises:
magnesium;
sulfur; and,
calcium.

4. The crop management system that plans and tracks nutrient delivery over time of claim 3, wherein the plurality of nutrients further comprises:
boron;
copper;
iron;
molybdenum;
manganese;
nickel;
zinc; and,
chlorine.

5. The crop management system that plans and tracks nutrient delivery over time of claim 1, wherein the processor is further configured to generate a chart of the nutrient fraction of one or more nutrients of the plurality of nutrients across the sequence of times that correspond to the feeding schedule; and, transmit the chart to the user interface.

6. The crop management system that plans and tracks nutrient delivery over time of claim 5, wherein the user interface is configured to accept a selection of the one or more nutrients to display in the chart.

7. The crop management system that plans and tracks nutrient delivery over time of claim 6, wherein:
the selection of the one or more nutrients to display in the chart comprises selection of one or more nutrient groups from a plurality of nutrient groups; and,
the plurality of nutrient groups comprises:
primary nutrients;
secondary nutrients; and,
micro nutrients.

8. The crop management system that plans and tracks nutrient delivery over time of claim 7, wherein:
the primary nutrients comprise
nitrogen;
phosphorus; and
potassium;
the secondary nutrients comprise
magnesium;
sulfur; and
calcium; and,
the micro nutrients comprise
boron;
copper;
iron;
molybdenum;
manganese;
nickel;
zinc; and
chlorine.

9. The crop management system that plans and tracks nutrient delivery over time of claim 1, wherein:
the plurality of fertilizers comprises water.

10. The crop management system that plans and tracks nutrient delivery over time of claim 9, wherein:
the fraction of each nutrient of the plurality of nutrients in water is zero.

11. The crop management system that plans and tracks nutrient delivery over time of claim 1, wherein the user interface is configured to accept input from the personnel to create and edit the feeding schedule.

12. The crop management system that plans and tracks nutrient delivery over time of claim 1, wherein the feeding schedule further comprises a growth stage associated with each time of the sequence of times, wherein the growth stage is selected from a plurality of growth stages.

13. The crop management system that plans and tracks nutrient delivery over time of claim 12, wherein the plurality of growth stages comprises three or more of:
a germination stage;
a clone stage;
a vegetative stage;
a stretch stage;
a stack stage;
a swell stage;
a ripening stage;
a seedling stage;
a flower stage;
a grow stage;
a bloom stage;
a fruiting stage; and,
a flush stage.

14. The crop management system that plans and tracks nutrient delivery over time of claim 1, wherein:
the database further comprises a multiplicity of feeding schedule templates to create said feeding schedule; and,
the user interface is configured to accept input from the personnel to define a new crop and to select a feeding schedule template to create said feeding schedule for the new crop from the multiplicity of feeding schedule templates.

15. The crop management system that plans and tracks nutrient delivery over time of claim 1, wherein:
the database further comprises one or more task entries, wherein a task entry of said one or more task entries comprises
a task description;
an assigned person selected from the personnel; and
a task date; and,
the user interface is configured to
accept input from the personnel to add or edit one or more new task entries; and
display a calendar of assigned tasks to each user of the personnel.

16. The crop management system that plans and tracks nutrient delivery over time of claim 15, wherein:
the one or more task entries comprise feeding tasks obtained from the feeding schedule.

17. The crop management system that plans and tracks nutrient delivery over time of claim 15, wherein:

the feeding schedule further comprises a growth stage associated with said each time of the sequence of times, wherein the growth stage is selected from a list comprising a plurality of growth stages that is appropriate for the crop of plants and a duration for the growth stage for said each time of the sequence of times is selected; and, the calendar further displays the growth stage associated with each calendar time period.

18. The crop management system that plans and tracks nutrient delivery over time of claim 1, wherein:

the database further comprises a journal associated with the crop of plants; and, the user interface accepts a journal entry comprising one or more of a note and a picture, and transmits the journal entry to the journal.

19. The crop management system that plans and tracks nutrient delivery over time of claim 1, wherein the processor is further configured to display a chart that comprises nutrient fraction trend information over time for said each nutrient fraction that is calculated for said each nutrient of said plurality of nutrients.

20. A crop management system that plans and tracks nutrient delivery over time, comprising:

a user interface used by personnel managing a crop of plants;

a database comprising information, wherein said information comprises a plurality of nutrients;

descriptions of a plurality of fertilizers, wherein a description of a fertilizer of said descriptions comprises a fraction of each nutrient of the plurality of nutrients in the fertilizer; and a feeding schedule comprising a sequence of times for fertilization of the crop of plants, wherein said sequence of times comprises a time unit presented sequentially at which said fertilizer is applied to the crop of plants; and for each time of the sequence of times, an amount of each fertilizer of the plurality of fertilizers applied to the crop of plants defined at the each time of the sequence of times for fertilization of the crop of plants;

a processor coupled to the user interface and to the database, wherein the processor is configured to for each time of the sequence of times from said feeding schedule and for each nutrient of the plurality of nutrients, calculate a nutrient fraction of the each nutrient at the each time as a weighted average of the fraction of the each nutrient in each fertilizer of the plurality of fertilizers across the plurality of fertilizers using said information in the database, wherein a weight associated with the each fertilizer comprises the amount of the each fertilizer applied to the crop of plants at the each time;

wherein the weighted average is calculated as a sum of products of all nutrient fractions from the nutrient fraction calculated of the each nutrient of the plurality of nutrients and the weight of said each fertilizer, divided by a total amount of all fertilizers applied at the each time of the sequence of times of said feeding schedule; and and generate a chart of the nutrient fraction of one or more nutrients of the plurality of nutrients across the sequence of times that correspond to the feeding schedule;

transmit the chart with the nutrient fraction of said each nutrient at said each time to the user interface.

* * * * *